United States Patent [19]

Tielemans

[11] Patent Number: 4,696,584
[45] Date of Patent: Sep. 29, 1987

[54] SELF-CLEANING AIR BEARING COMPRISING A FLOW EQUALIZING GROOVE AT THE BEARING PERIPHERY

[75] Inventor: Leonardus P. M. Tielemans, Eindhoven, Netherlands

[73] Assignee: U.S. Philips Corporation, New York, N.Y.

[21] Appl. No.: 807,779

[22] Filed: Dec. 11, 1985

Related U.S. Application Data

[63] Continuation of Ser. No. 547,147, Oct. 31, 1983, abandoned.

[30] Foreign Application Priority Data

Nov. 19, 1982 [NL] Netherlands ................. 8204481

[51] Int. Cl.$^4$ ............................................. F16C 32/06
[52] U.S. Cl. ................................. 384/107; 384/113; 384/114; 384/120; 384/121
[58] Field of Search ............. 384/99, 100, 107, 111, 384/114, 118, 120, 115, 119, 124, 121, 130, 132, 134; 277/3, 27, DIG. 5

[56] References Cited

U.S. PATENT DOCUMENTS

| 3,167,362 | 1/1965 | Dschen | 384/118 |
| 3,321,254 | 5/1967 | Dock | 384/114 |
| 3,337,275 | 8/1967 | Dschen | 384/115 |
| 3,517,973 | 6/1970 | Hirs | 384/115 |

FOREIGN PATENT DOCUMENTS

| 550738 | 12/1957 | Canada | 384/100 |
| 648425 | 9/1962 | Canada | 384/114 |
| 2742516 | 3/1979 | Fed. Rep. of Germany | 384/114 |
| 1022391 | 3/1966 | United Kingdom . | |
| 1068448 | 5/1967 | United Kingdom . | |
| 1163018 | 9/1969 | United Kingdom . | |

Primary Examiner—Stuart S. Levy
Assistant Examiner—David Werner
Attorney, Agent, or Firm—David R. Treacy

[57] ABSTRACT

An aerostatic or aerodynamic bearing comprising a stationary part and a movable part with cooperating bearing surfaces between which there is formed a bearing gap which at one area communicates with an air inlet and at another area opens into the atmosphere. The air inlet comprises one or more filters, and at least one of the bearing surfaces is provided with a pressure-equalizing groove near the area at which the bearing gap opens into the atmosphere.

2 Claims, 2 Drawing Figures

SELF-CLEANING AIR BEARING COMPRISING A FLOW EQUALIZING GROOVE AT THE BEARING PERIPHERY

This is a continuation of application Ser. No. 547,147, filed Oct. 31, 1983, now abandoned.

BACKGROUND OF THE INVENTION

The invention relates to an aerostatic or aerodynamic bearing (hereinafter referred to as an air bearing) comprising a stationary part and a movable part with co-operating bearing surfaces which are separated by a bearing gap which at one area communicates with an air inlet and at another area opens into the atmosphere.

In the case of an aerostatic bearing, air can be supplied under pressure to the bearing gap through the inlet.

In the case of an aerodynamic bearing, the bearing surfaces bounding the gap are provided with at least one pattern of grooves which, in the operation of the bearing, build up a pressure in the air contained in the bearing gap and pump the air from the inlet to the atmosphere.

In air bearings of the above kind, the bearing clearance is only a few $\mu$m.

Air from the surrounding atmosphere is often used as a lubricant for these bearings. Due to the small dimension of the bearing gap, dust particles present in the air contaminate the bearing gap to the detriment of the operation of the bearing. In order to avoid this it has been proposed to supply the air through filters to the bearing gap. However, this has proved inadequate because contamination still occurs at the outlet side of the bearing gap. This can be explained as follows. If due to load—and/or geometry—some cooperating bearing surfaces do not move in exactly parallel planes in the case of an axial bearing or exactly concentrically with each other in the case of a radial bearing, both positive and negative pressure differences occur in the bearing gap with respect to the surrounding atmosphere. These pressure differences continue as far as the periphery of the bearing gap, which may result in air flowing out of the gap over one part of the area at which the bearing gap opens into the atmosphere and air flowing in over another part. In this way dust particles present in the air enter the bearing gap, where they can get stuck. An adequate circulation of filtered air through the bearing gap for preventing a negative pressure occurring in regions of the gap cannot be obtained in an aerodynamic bearing while still maintaining a sufficient bearing capacity and stability. In aerostatic bearings also this causes problems in connection with the larger quantities of air that have to be pumped.

SUMMARY OF THE INVENTION

The invention has for its object to provide an air bearing in which the problem of contamination of the bearing gap is solved effectively in a constructionally simple manner while maintaining favorable bearing properties.

In an air bearing according to the invention at least one filter is arranged in the air inlet and at least one of the bearing surfaces is provided with a pressure-equalizing groove at or near the area at which the bearing gap opens into the atmosphere. The groove thus equalizes the flow of air from the gap periphery to the atmosphere.

With a filter or filters in the air inlet, only pure air can be supplied to the bearing gap. The presence of the pressure-equalizing groove prevents surrounding air entering the bearing gap at regions in which a sub-atmospheric pressure prevails. The air in the regions in which an excess pressure prevails spreads through the pressure-equalizing groove along the whole area at which the bearing gap opens into the atmosphere, so that on the one hand a circulation of air from regions in which an excess pressure prevails to regions in which a sub-atmospheric pressure prevails is obtained; while on the other hand, due to the presence of a sufficient quantity of air in the whole pressure-equalizing groove, air flows out to the atmosphere over the whole area at which the bearing gap opens into the atmosphere. Thus, the groove acts as a flow-equalizing groove, and no contaminated air can flow into the bearing gap.

The invention will be described more fully with reference to two embodiments shown in the drawings.

DESCRIPTION OF THE PREFERRED EMBODIMENTS

Figure 1:
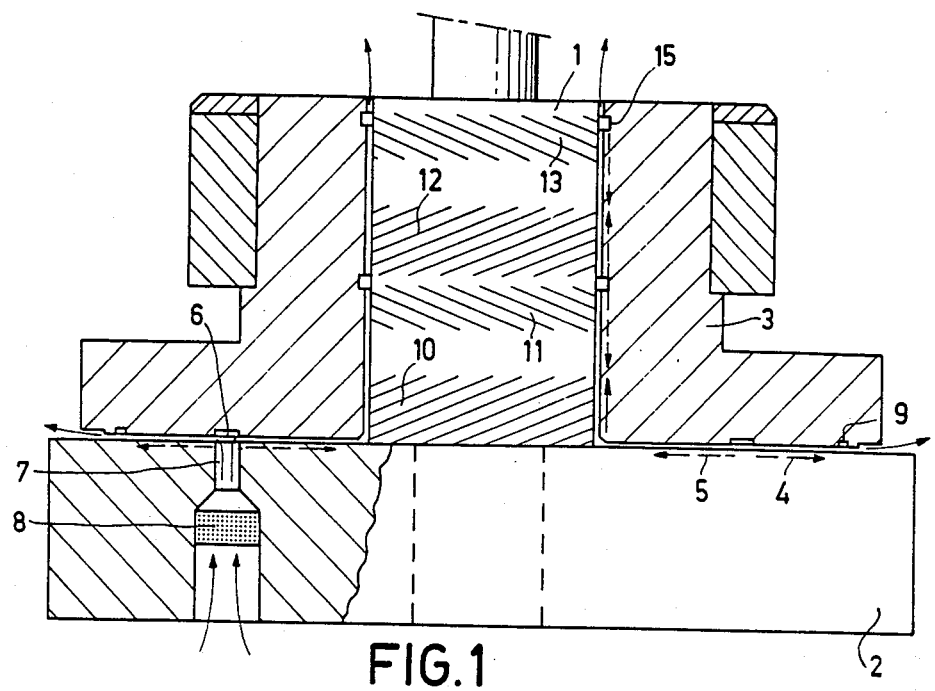
FIG. 1 is a diagrammatic sectional view of a shaft with a flange on which a rotatable bush is aerodynamically journalled both radially and axially.

In FIG. 1, reference numeral 1 designates a shaft which is provided with a flange 2. A bush 3 surrounds the shaft 1. The co-operating thrust bearing surfaces of the flange 2 and the bush 3 are separated by a bearing gap and are provided with a pattern 4 of outwardly pumping shallow grooves and with a pattern 5 of shallow grooves which pump inwardly towards the longitudinal axis of the shaft 1. An annular groove 6 into which an air inlet 7 opens is provided between the two patterns 4 and 5. A filter 8 is arranged in the air inlet 7.

The groove pattern 4 is limited along its outer circumference by an ungrooved annular ring of the bush 3 in which a continuous circular groove 9 is provided. The groove 9 may alternatively be formed in the flange 2.

Two pairs of groove patterns 10-11 and 12-13 are provided in the shaft 1 to form a cylindrical bearing, the two patterns of each pair being arranged to act in opposite senses. The pumping effect of these groove patterns in operation is such that an air flow is invariably maintained in the bearing gap between the cooperating bearing surfaces of the shaft 1 and the bush 3, the flow taking place in an axial direction towards the exterior of the bearing. The outer pattern of grooves 13 is limited by a continuous pressure-equalizing groove 15.

Both with the axial bearing 4, 5 and with the radial bearings 10-11, 12-13, it is quite possible that in operation, as well as a large region in which a positive pressure is built up there are also regions in which a negative or sub-atmospheric pressure prevails, for example, when the cooperating bearing surfaces are not exactly parallel to each other or concentric with each other as the case may be. In those regions in which a sub-atmospheric pressure prevails, contaminated ambient air could flow in. It is to avoid this that the grooves 9 and 15 are provided. Air in the regions in which an excess pressure prevails flows into the grooves 9 and 15 and immediately fills these grooves completely so that a sub-atmospheric pressure no longer prevails therein.

Air for the regions in which a sub-atmospheric pressure prevails is then drawn from one of these grooves 9 and 15 so that effectively an internal circulation is obtained. This, contamination of the bearing gaps is avoided.

Figure 2:
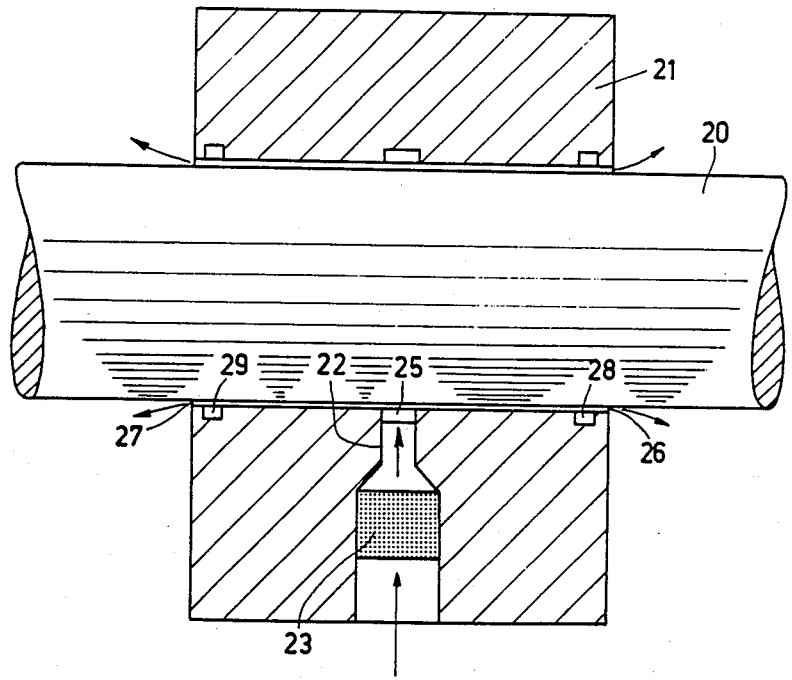
FIG. 2 is a diagrammatic sectional view of a bearing bush with a shaft aerostatically journalled therein.

FIG. 2 shows diagrammatically an aerostatic radial bearing comprising a shaft 20 and a bearing bush 21.

The bearing bush 21 is provided with an inlet 22 which contains a filter 23 and which can be connected to a source of compressed air. The inlet opens into the bearing gap between the shaft and the bush at the area 25 and the gap opens into the atmosphere at the areas 26 and 27 respectively. In this bearing also an excess pressure prevails in a large region of the bearing gap to support the load. Furthermore, there is practically always a region in which a sub-atmospheric pressure prevails, at any rate when the air flow supplied is not very large. Ambient air has a tendency to enter the latter region and to contaminate the bearing gap. In order to avoid this, grooves 28 and 29, respectively, are provided in the bush 21. The effect of these grooves is that air from the region in which an excess pressure prevails spreads in these grooves, equalizes the flow at the bearing end areas, and effectively seals the region of sub-atmospheric pressure from the atmosphere.

An internal recirculation of air may take place from the grooves 28 and 29, but this has no contaminating effect because this air is clean.

This particularly simple step completely prevents the bearing gap both in aerodynamic and in aerostatic bearings from being contaminated.

What is claimed is:

1. A self-cleaning air bearing comprising a first part which rotates about an axis, and a second part, each of said parts having cooperating bearing surfaces dimensioned and configured to define at least one bearing gap, said gap having at least one circular periphery having an area at which the bearing gap opens into the atmosphere, an air inlet communicating with said bearing gap at a location spaced from said periphery, and with the atmosphere, at least one filter disposed in said air inlet, at least one pattern of grooves formed on one of said surfaces for causing air to flow through said at least one filter into said gap, and at least one continuous circular flow equalizing groove formed in one of said bearing surfaces, and disposed at least adjacent said area, arranged such that a flow of air is maintained outward to the atmosphere along all of said area;

said bearing comprising a thrust bearing having an outer circumference and an inner circular periphery, said flow equalizing groove being an annular groove disposed adjacent said outer circumference of said bearing, said gap extending between said groove and said inner circular periphery, and said air inlet being spaced intermediately between said groove and said inner circular periphery, said thrust bearing being arranged so as to pump air from said air inlet to said annular groove.

2. A self-cleaning air bearing comprising a first part which rotates about an axis, and a second part, each of said parts having cooperating bearing surfaces dimensioned and configured to define at least one bearing gap, said gap having at least one circular periphery having an area at which the bearing gap opens into the atmosphere, an air inlet communicating with said bearing gap at a location spaced from said periphery, and with the atmosphere, at least one filter disposed in said air inlet, at least one pattern of grooves formed on one of said surfaces for causing air to flow through said at least one filter into said gap, and at least one continuous circular flow equalizing groove formed in one of said bearing surfaces, and disposed at least adjacent said area, arranged such that a flow of air is maintained outward to the atmosphere along all of said area;

said bearing comprising a thrust bearing and a cylindrical bearing;

said thrust bearing having an outer circumference and an inner circular periphery, said flow equalizing groove being an annular groove disposed adjacent said outer circumference of said bearing, said gap extending between said groove and said inner circular periphery, and said air inlet being spaced intermediately between said groove and said inner circular periphery;

said cylindrical bearing having a cylindrical bearing surface concentric about said axis, having a cylindrical gap arranged to communicate with said inner circular periphery and to extend axially to an outer cylindrical area communicating with the atmosphere; and a second continuous circular groove at least adjacent said outer cylindrical area, said thrust bearing being arranged so as to pump air from said air inlet to said annular groove and to said inner periphery, and said cylindrical bearing being arranged such that air flows through said cylindrical gap from said inner periphery to said second groove, whereby air outflow through the entire outer cylindrical area prevents dust from entering said bearing.

* * * * *